(12) United States Patent
Hou et al.

(10) Patent No.: US 11,158,843 B2
(45) Date of Patent: Oct. 26, 2021

(54) METHOD FOR MAKING NANOPOROUS NICKEL COMPOSITE MATERIAL

(71) Applicants: Tsinghua University, Beijing (CN); HON HAI PRECISION INDUSTRY CO., LTD., New Taipei (TW)

(72) Inventors: Ze-Cheng Hou, Beijing (CN); Yuan-Feng Liu, Beijing (CN); Lin Zhu, Beijing (CN); Wen-Zhen Li, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 293 days.

(21) Appl. No.: 16/395,527

(22) Filed: Apr. 26, 2019

(65) Prior Publication Data

US 2020/0321602 A1    Oct. 8, 2020

(30) Foreign Application Priority Data

Apr. 2, 2019   (CN) .......................... 201910263406.1

(51) Int. Cl.
*C23C 28/00* (2006.01)
*C25D 5/48* (2006.01)
(Continued)

(52) U.S. Cl.
CPC ......... *H01M 4/0452* (2013.01); *C23C 28/322* (2013.01); *C23C 28/34* (2013.01);
(Continued)

(58) Field of Classification Search
CPC ......... C23C 28/34; C23C 28/00; C23C 28/42; C25D 5/48
(Continued)

(56) References Cited

U.S. PATENT DOCUMENTS

| 10,253,423 B2 | 4/2019 | Fu et al. |
| 2018/0319664 A1* | 11/2018 | Fu .................. C01B 32/158 |
| 2019/0055636 A1 | 2/2019 | Xiong et al. |

FOREIGN PATENT DOCUMENTS

| CN | 107794554 | 3/2018 |
| CN | 108866412 | 11/2018 |

(Continued)

OTHER PUBLICATIONS

Bahr et al., "Composite Metallic Nanofoam Structures," 2016, p. 1. (Year: 2016).*

(Continued)

*Primary Examiner* — Edna Wong
(74) *Attorney, Agent, or Firm* — ScienBiziP, P.C.

(57) ABSTRACT

A method for making nanoporous nickel composite material comprises: providing a cathode plate and a copper-containing anode plate, electroplating a copper material layer a surface of the cathode plate; laying a carbon nanotube layer on the copper material layer, and forming an overlapped structure of the copper material layer and the carbon nanotube laye; the cathode plate and the overlapped structure are used as a cathode, and a nickel-containing anode plate is used as an anode, plating a nickel material layer on the overlapped structure to form sandwich structure; repeating steps S1 to S3 to obtain a carbon nanotube-reinforced copper-nickel alloy; rolling and annealing the carbon nanotube-reinforced copper-nickel alloy; and etching the carbon nanotube-reinforced copper-nickel alloy to form the nanoporous nickel composite material.

13 Claims, 6 Drawing Sheets

(51) Int. Cl.
- *H01M 4/04* (2006.01)
- *H01M 4/36* (2006.01)
- *H01M 4/88* (2006.01)
- *H01M 4/133* (2010.01)
- *C25F 3/02* (2006.01)
- *C25D 5/12* (2006.01)
- *H01M 4/02* (2006.01)

(52) U.S. Cl.
CPC ............. *C25D 5/12* (2013.01); *C25D 5/48* (2013.01); *C25F 3/02* (2013.01); *H01M 4/0461* (2013.01); *H01M 4/133* (2013.01); *H01M 4/366* (2013.01); *H01M 4/8882* (2013.01); *H01M 2004/027* (2013.01); *H01M 2004/028* (2013.01)

(58) Field of Classification Search
USPC .......................................... 205/220, 223, 224
See application file for complete search history.

(56) References Cited

FOREIGN PATENT DOCUMENTS

| | | |
|---|---|---|
| TW | 201843351 | 12/2018 |
| TW | 201912814 | 4/2019 |

OTHER PUBLICATIONS

Chang et al., "Formation of Nanoporous Nickel by Selective Anodic Etching of the Nobler Copper Component from Electrodeposited Nickel-Copper Alloys," The Journal of Physical Chemistry C. (Feb. 7, 2008), vol. 112, No. 5, pp. 1371-1376. (Year: 2008).*

* cited by examiner

S1, providing a cathode plate and a copper-containing anode plate, electroplating a copper material layer a surface of the cathode plate;

S2, laying a carbon nanotube layer on the copper material layer, and forming an overlapped structure of the copper material layer and the carbon nanotube layer on the surface of the cathode plate;

S3, the cathode plate and the overlapped structure are used as a cathode, and a nickel-containing anode plate is used as an anode, plating a nickel material layer on the overlapped structure to form sandwich structure of the copper material layer, the carbon nanotube layer and the nickel material layer;

S4: repeating steps S1 to S3 to obtain a carbon nanotube-reinforced copper-nickel alloy comprising a plurality of sandwich structures overlapped with each other;

S5: rolling and annealing the carbon nanotube-reinforced copper-nickel alloy; and S6: etching the carbon nanotube-reinforced copper-nickel alloy to form the nanoporous nickel composite material.

FIG. 1

METHOD FOR MAKING NANOPOROUS NICKEL COMPOSITE MATERIAL

CROSS-REFERENCE TO RELATED APPLICATIONS

This application claims all benefits accruing under 35 U.S.C. § 119 from China Patent Application No. 201910263406.1, filed on Apr. 2, 2019, in the China National Intellectual Property Administration, the contents of which are hereby incorporated by reference.

FIELD

The present disclosure relates to a method for making nanoporous nickel composite material.

BACKGROUND

The nanoporous nickel structure is composed of a nickel skeleton with a large amount of internal pores. Compared with a dense nickel, the nanoporous nickel structure with the large amount of internal pores have many excellent characteristics, such as a small density, a large specific surface area, excellent optical properties and electrochemical performance. Therefore, it can be used to make filters, catalysts, catalyst carriers, and porous electrodes, etc. The nanoporous nickel structure has become one of the hot spots in research field of new porous materials. However, the strength of the nanoporous nickel structure limits the application of it. In order to solve the above problems, nanomaterials are often added as a reinforcement to a nickel matrix to form a nickel-based composite. The properties of the nickel-based composite material mainly depend on a type and a content of the reinforcement in the nickel matrix, a dispersion state of the reinforcement, and the interface state with the nickel matrix. Nanomaterials used in currently common nickel-based composite reinforcements mainly include carbon nanotubes, graphene, and the like.

However, the disordered carbon nanotubes are easy to agglomeration in the nickel matrix, resulting in uneven distribution in the nickel matrix, which affects the performance of the nickel-based composite material.

Therefore, there is room for improvement within the art.

BRIEF DESCRIPTION OF THE DRAWINGS

Implementations of the present technology will now be described, by way of example only, with reference to the attached figures, wherein:

FIG. 1 is a flow chat showing a method for preparing of making nanoporous nickel composite material according to one embodiment.

DETAILED DESCRIPTION

Figure 2:
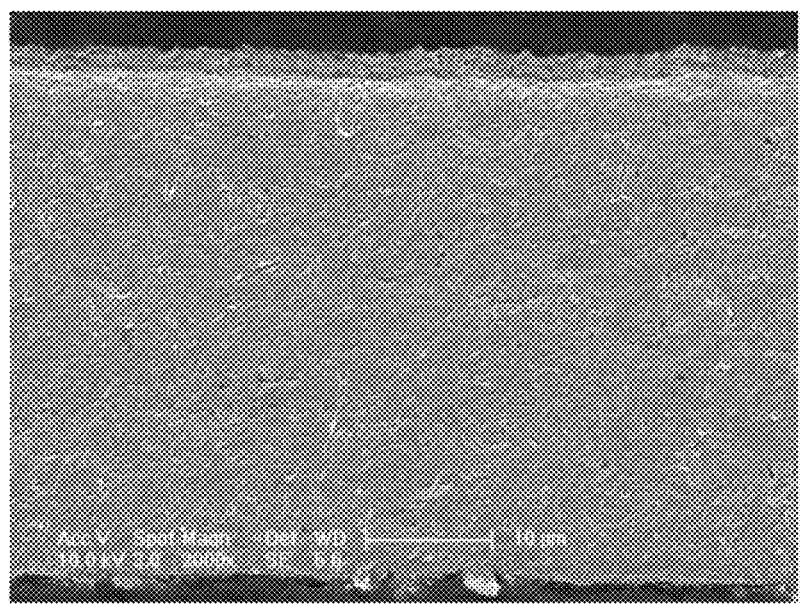
FIG. 2 is a micrograph photo of a cross section of a carbon nanotube-reinforced copper-nickel alloy provided by an embodiment of the present invention.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Referring to FIG. 1, a method for making a nanoporous nickel composite material according to one embodiment comprises steps of:

S1, providing a cathode plate and a copper-containing anode plate, electroplating a copper material layer a surface of the cathode plate;

S2, laying a carbon nanotube layer on the copper material layer, and forming an overlapped structure of the copper material layer and the carbon nanotube layer on the surface of the cathode plate;

S3, the cathode plate and the overlapped structure are used as a cathode, and a nickel-containing anode plate is used as an anode, plating a nickel material layer on the overlapped structure to form sandwich structure of the copper material layer, the carbon nanotube layer and the nickel material layer;

S4: repeating steps S1 to S3 to obtain a carbon nanotube-reinforced copper-nickel alloy comprising a plurality of sandwich structures overlapped with each other;

S5: rolling and annealing the carbon nanotube-reinforced copper-nickel alloy; and S6: etching the carbon nanotube-reinforced copper-nickel alloy to form the nanoporous nickel composite material.

In step S1, the cathode plate can be a conductive titanium plate with a planar surface. An electroplating solution used in the electroplating process in step S1 is a copper electroplating solution. The cathode plate can be washed and dried with acetone before being placed in the copper electroplating solution. Optionally, in order to achieve a better plating effect, an insulated material is attached on a back surface of the cathode plate to cover the back surface of the cathode plate. The copper-containing anode plate is a phosphor bronze plate. The electroplating process is carried out under direct current conditions. During the electroplating process, the copper electroplating solution is continuously stirred using a stirring device. A duration of the electroplating process is ranged from 1 minute to 30 minutes, and a current density during the electroplating process is in a range from 1 to 5 $A/dm^2$. The copper plating solution is a copper salt, and can be copper chloride, copper sulfate, copper nitrate or the like. In this embodiment, the copper plating solution is composed of $CuSO_4.5H_2O$ (300 g/L), $H_2SO_4$ (50 g/L), and glucose (1 g/L).

In step S2, the surface of the copper material layer can be cleaned with alcohol to remove the copper plating solution attached on the surface of the copper material layer before the carbon nanotube layer is laid. The carbon nanotube layer is laid on the surface of the copper material layer that is dried. After the carbon nanotube layer is laid on the surface of the copper material layer, the carbon nanotube layer can be further infiltrated with alcohol to make the carbon nanotube layer and the copper material layer combined with each other tightly. The carbon nanotube layer includes a plurality of carbon nanotubes, and the plurality of carbon nanotubes can be arranged orderly or randomly. When the plurality of carbon nanotubes are orderly arranged, the carbon nanotube layer includes at least one carbon nanotube film. The carbon nanotube film includes a plurality of carbon nanotubes joined end to end by Van der Waals attractive force and extending along a same direction. The plurality of carbon nanotubes are parallel to each other. The extension direction of the plurality of carbon nanotubes is defined as a length direction of the carbon nanotube film, and the direction perpendicular to the extension direction is the width direction of the carbon nanotube film. In the length direction of the carbon nanotube film, the carbon nanotubes are joined end to end, so that the length of the carbon nanotube film is a sum of the lengths of the plurality of carbon nanotubes joined end to end. In the width direction of the carbon nanotube film, the plurality of carbon nanotubes are arranged side by side, and the width of the carbon nanotube film is a sum of the diameters of the plurality of carbon nanotubes in the width direction. When the carbon nanotube layer comprises a plurality of carbon nanotube films, the extending direction of the plurality of carbon nanotubes in adjacent carbon nanotube films are crossed with each other to form an angle, and the angle is less than or equal to 90 degrees, which can be 0 degrees, 30 degrees, 45 degrees or 90 degrees.

In step S3, the nickel-containing anode plate is a nickel plate. The electroplating process is carried out under direct current conditions. During the electroplating process, the nickel electroplating solution is continuously stirred using a stirring device. A duration of the electroplating process is ranged from 1 minute to 30 minutes, and a current density during the electroplating process is in a range from 1 to 5 $A/dm^2$. A plating solution used in the plating process in step S3 is a nickel plating solution. The nickel plating solution is a nickel salt, and can be nickel sulfate, nickel chloride, nickel nitrate or the like. In this embodiment, the nickel plating solution is composed of $NiSO_4.7H_2O$ (240 g/L), $NiCl_2.6H_2O$ (20 g/L), and $H_3BO_3$ (15 g/L).

In step S4, each layer of the sandwich structure can be obtained by repeating steps S1 to S3 and to obtain a plurality of sandwich structures, and then the plurality of sandwich structures is overlapped with each other to form the carbon nanotube-reinforced copper-nickel alloy. In other embodiments, a composite structure of the cathode plate and the sandwich structure obtained in step S3 can used as a new cathode plate, and then repeating steps S1 to S3 to obtain a plurality sandwich structures. The plurality of sandwich structures is removed from the titanium plate to obtain a carbon nanotube-reinforced copper-nickel alloy.

Step S5 includes the following steps:

S51: degreasing the carbon nanotube-reinforced copper-nickel alloy;

S52: heat-treating the carbon nanotube-reinforced copper-nickel alloy to de-alloy the carbon nanotube-reinforced copper-nickel alloy.

In the step S51, in one embodiment, the carbon nanotube-reinforced copper-nickel alloy is ultrasonically degreased in an organic solvent, and then the carbon nanotube-reinforced copper-nickel alloy is washed with a cleaning agent. The organic solvent can be acetone, diethyl ether or the like. The cleaning agent can be pure water or alcohol.

In step S52, before the heat-treating the carbon nanotube-reinforced copper-nickel alloy, the carbon nanotube-reinforced copper-nickel alloy can be rolled by a manual rolling apparatus to reduce a thickness of the carbon nanotube-reinforced copper-nickel alloy to improve a density of the carbon nanotube-reinforced copper-nickel alloy. In one embodiment, the carbon nanotube-reinforced copper-nickel alloy is rolled to half its original thickness. The step of heat-treating the carbon nanotube-reinforced copper-nickel alloy comprises: annealing the carbon nanotube-reinforced copper-nickel alloy in an inert atmosphere (such as argon, nitrogen, etc.) at a temperature ranged from 400 to 500° C., an annealing time is ranged from 20 to 24 h to make sure that copper atoms and nickel atoms are melted enough to form the carbon nanotube-reinforced copper-nickel alloy with uniform structure.

In step S6, the carbon nanotube-reinforced copper-nickel alloy is used as a working electrode in a three-electrode system for the electrochemical etching. In one embodiment, a platinum electrode is used as a counter electrode, and saturated Ag/AgCl is used as a reference electrode for the electrochemical etching in a plating solution. The plating solution is a mixed solution containing copper and nickel ions, an electrochemical etching voltage range is ranged from 0.8 to 2V, and the etching time is ranged from 200 s to 4000 s.

EXAMPLE 1

Step S1: The copper plating solution is composed of $CuSO_4.5H_2O$ (300 g/L), $H_2SO_4$ (50 g/L), and glucose (1 g/L), and the total volume of the copper plating solution is 7. The titanium substrate is cleaned with ethanol and acetone and then is dried, and then the titanium substrate was used as the cathode plate. First, the phosphor bronze plate is used as the anode, the electroplating current is 3 A, the current density is 3 $A/dm^2$, and the single layer electroplating time is 4 min. After the electroplating process was completed, the surface of the nickel material layer is washed with ethanol and dried.

In step S2, a carbon nanotube film is deposited on the surface of the copper material layer. The carbon nanotube film includes a plurality of carbon nanotubes joined end to end and extending a same direction.

In step S3, the nickel plating solution is composed of $NiSO_4 \cdot 7H_2O$ (240 g/L), $NiCl_2 \cdot 6H_2O$ (20 g/L), and $H_3BO_3$ (15 g/L), and a volume of the nickel plating solution is 7. The nickel plate was used as the anode, the electroplating current is 4 A, the current density is 4 $A/dm^2$, and the single layer electroplating time is 3 min. After the nickel material layer is formed, it is washed with alcohol and dried.

In step S4, the composite structure of the cathode plate and the sandwich structure obtained in step S3 is used as a new cathode plate, and then repeating steps S1 to S3 to obtain 24 layers of sandwich structures.

Figure 3:
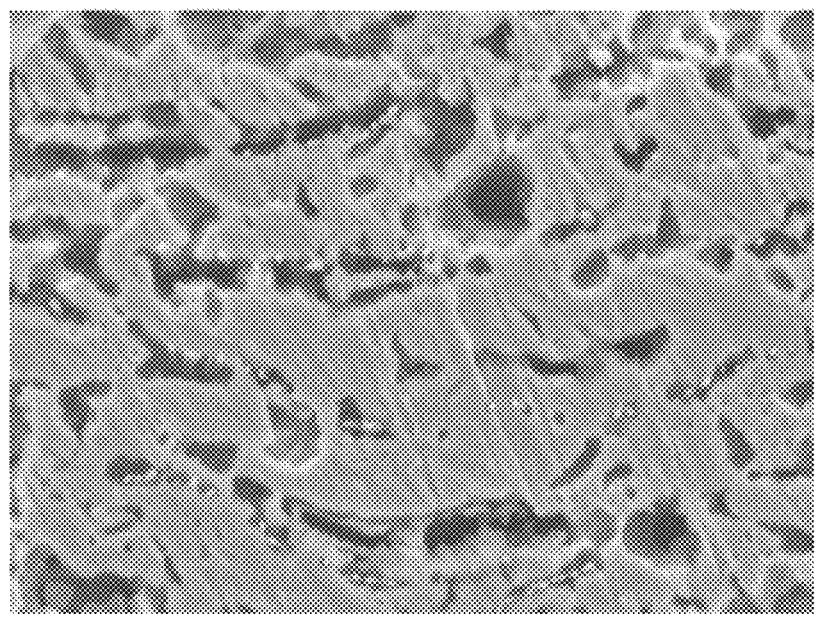
FIG. 3 is a photomicrograph of the cross section of the carbon nanotube-reinforced copper-nickel alloy of FIG. 1 after chemical etching by an etching solution.

In step S5, the carbon nanotube-reinforced copper-nickel alloy is placed in acetone for ultrasonic degreasing, and then the carbon nanotube-reinforced copper-nickel alloy is rolled to half of the initial thickness at room temperature using a manual rolling apparatus. A rolling direction is parallel with the extending direction of the carbon nanotubes. Then, an around the carbon nanotube-reinforced copper-nickel alloy is cut off to remove the crack. Finally, the carbon nanotube-reinforced copper-nickel alloy is annealed, and the annealing process is carried out in an argon atmosphere. The annealing parameters are: annealing temperature 500° C., annealing time 12 h, and the annealed carbon nanotube-reinforced copper-nickel alloy is obtained. A cross-sectional morphology of the annealed carbon nanotube-reinforced copper-nickel alloy is shown in FIG. 2. Then, the surface of the annealed carbon nanotube-reinforced copper-nickel alloy is chemical etched after being grinded and polished. The chemical etching solution was $FeCl_3$ (5 g), hydrochloric acid (2 ml) and ethanol (99 ml), and the chemical etching time is 2 s. A cross-sectional morphology obtained after corrosion is shown in FIG. 3. It can be seen from FIG. 2 that, the structure of the annealed carbon nanotube-reinforced copper-nickel alloy is dense. It can be seen from FIG. 3 that, the carbon nanotubes are uniformly distributed in the carbon nanotube-reinforced copper-nickel alloy.

Figure 4:
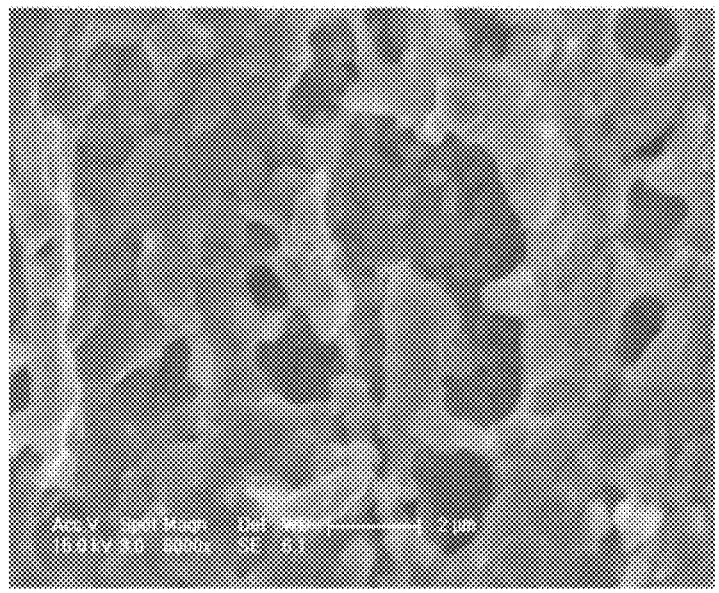
FIG. 4 is a photomicrograph of a cross section of a nanoporous nickel composite material obtained after an electrochemical etching process with a corrosion voltage of 1 V and a corrosion time of 200 s in one embodiment of the present invention.
Figure 5:
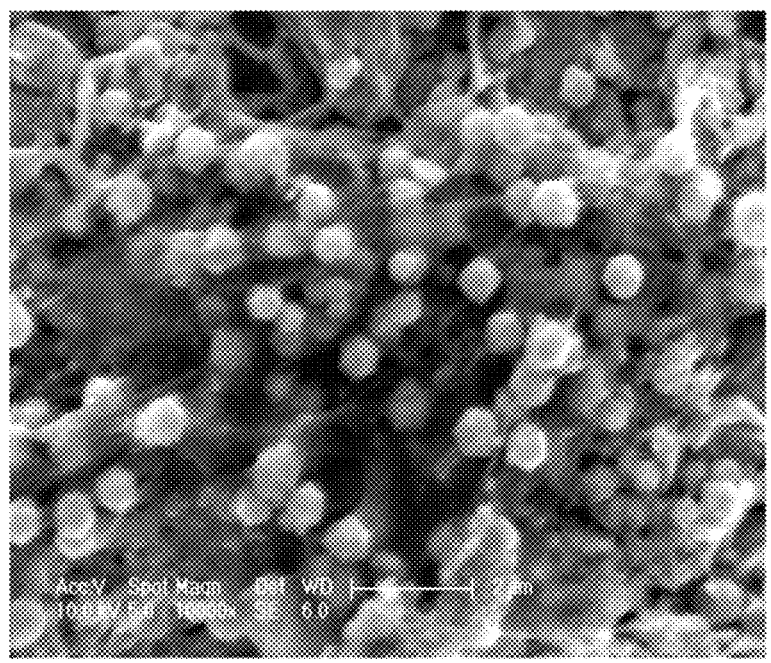
FIG. 5 is a photomicrograph of a cross section of a nanoporous nickel composite material obtained after an electrochemical etching process with a corrosion voltage of 1 V and a corrosion time of 400 s in one embodiment of the present invention.
Figure 6:
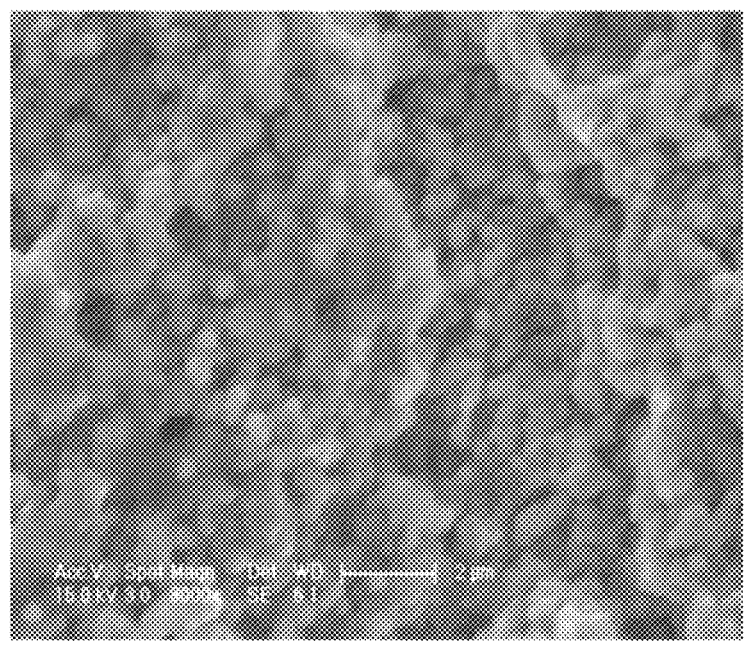
FIG. 6 is a photomicrograph of a cross section of a nanoporous nickel composite material obtained after an electrochemical etching process with a corrosion voltage of 1 V and a corrosion time of 1000 s in one embodiment of the present invention.

The annealed carbon nanotube-reinforced copper-nickel alloy is etched by an electrochemical de-alloying method, which includes: cutting 1×1 $cm^2$ of the carbon nanotube-reinforced copper-nickel alloy prepared as the working electrode, and the platinum electrode is the counter electrode, saturated Ag/AgCl is the reference electrode, and the 200 ml electroplating solution is composed of $NiSO_4 \cdot 6H_2O$ (1 M), $CuSO_4 \cdot 5H_2O$ (0.1 M) and $H_3BO_3$ (0.5 M) to form a three-electrode system. The corrosion voltage is 1V. When the etching time is 200 s, the cross-sectional photograph of the obtained nanoporous nickel composite is shown in FIG. 4; when the etching time is 400 s, the cross-sectional photograph of the obtained nanoporous nickel composite is shown in FIG. 5; when the etching time is 1000 s, a cross-sectional photograph of the obtained nanoporous nickel composite material is shown in FIG. 6. As can be seen from FIG. 4 to FIG. 6, diameters of the pore diameter of the nanoporous nickel composite material is in nano-scale.

The method for making the nanoporous nickel composite material provided by the present invention has the following advantages: first, there is no need to disperse the carbon nanotubes in the metal matrix, and the characteristics of the carbon nanotubes orientation arrangement are retained in the composite material to realize the uniform distribution of the carbon nanotubes in the metal matrix; secondly, the method is convenient and efficient, does not require complicated and expensive equipment, has a low cost, and can be carried out at room temperature to realize rapid preparation of the nanoporous nickel composite material.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for making nanoporous nickel composite material comprising:
    S1: providing a cathode plate and a copper-containing anode plate, electroplating a copper material layer on a surface of the cathode plate;
    S2: laying a carbon nanotube layer on the copper material layer, and forming an overlapped structure of the copper material layer and the carbon nanotube layer on the surface of the cathode plate;
    S3: the cathode plate and the overlapped structure are used as a cathode, and a nickel-containing anode plate is used as an anode, electroplating a nickel material layer on the overlapped structure to form a sandwich structure of the copper material layer, the carbon nanotube layer and the nickel material layer;
    S4: repeating steps S1 to S3 to obtain a carbon nanotube-reinforced copper-nickel alloy comprising a plurality of sandwich structures overlapped with each other;
    S5: rolling and heat-treating the carbon nanotube-reinforced copper-nickel alloy; and
    S6: electrochemical etching the rolled and heat-treated carbon nanotube-reinforced copper-nickel alloy to form the nanoporous nickel composite material.

2. The method of claim 1, wherein in step S1, an insulated material is attached on a back surface of the cathode plate to cover the back surface of the cathode plate.

3. The method of claim 1, wherein in step S1, a duration of electroplating the copper material layer on the surface of the cathode plate is ranged from 1 minute to 30 minutes.

4. The method of claim 1, wherein in step S1, a current density during electroplating the copper material layer on the surface of the cathode plate is in a range from 1 to 5 $A/dm^2$.

5. The method of claim 1, wherein in step S2, after the carbon nanotube layer is laid on the surface of the copper material layer, the carbon nanotube layer can be further infiltrated with alcohol to make the carbon nanotube layer and the copper material layer combined with each other tightly.

6. The method of claim 5, wherein in step S3, a duration of electroplating the nickel material layer on the overlapped structure is in a range from 1 minute to 30 minutes.

7. The method of claim 1, wherein in step S2, the carbon nanotube layer comprises a plurality of carbon nanotubes arranged orderly.

8. The method of claim 1, wherein in step S3, a current density during electroplating the nickel material layer on the overlapped structure is in a range from 1 to 5 $A/dm^2$.

9. The method of claim 1, wherein in step S4, each layer of the sandwich structure is obtained by repeating steps S1 to S3 and to obtain the plurality of sandwich structures.

10. The method of claim 9, wherein the plurality of sandwich structures is overlapped with each other to form the carbon nanotube-reinforced copper-nickel alloy.

11. The method of claim 1, wherein step S5 comprises:
   S51: degreasing the carbon nanotube-reinforced copper-nickel alloy; and
   S52: heat-treating the carbon nanotube-reinforced copper-nickel alloy after being degreased to de-alloy the carbon nanotube-reinforced copper-nickel alloy.

12. The method of claim 1, wherein in step S5, before the the rolling step comprises: the carbon nanotube-reinforced copper-nickel alloy is rolled by a manual rolling apparatus to reduce a thickness of the carbon nanotube-reinforced copper-nickel alloy.

13. The method of claim 12, wherein the step of heat-treating the carbon nanotube-reinforced copper-nickel alloy comprises: annealing the carbon nanotube-reinforced copper-nickel alloy in an inert atmosphere at a temperature ranged from 400 to 500° C., and an annealing time is ranged from 20 to 24h.

\* \* \* \* \*